J. L. BALDWIN.
SEEDING ATTACHMENT FOR PLANTERS.
APPLICATION FILED SEPT. 18, 1909.
949,254.
Patented Feb. 15, 1910.
2 SHEETS—SHEET 1.
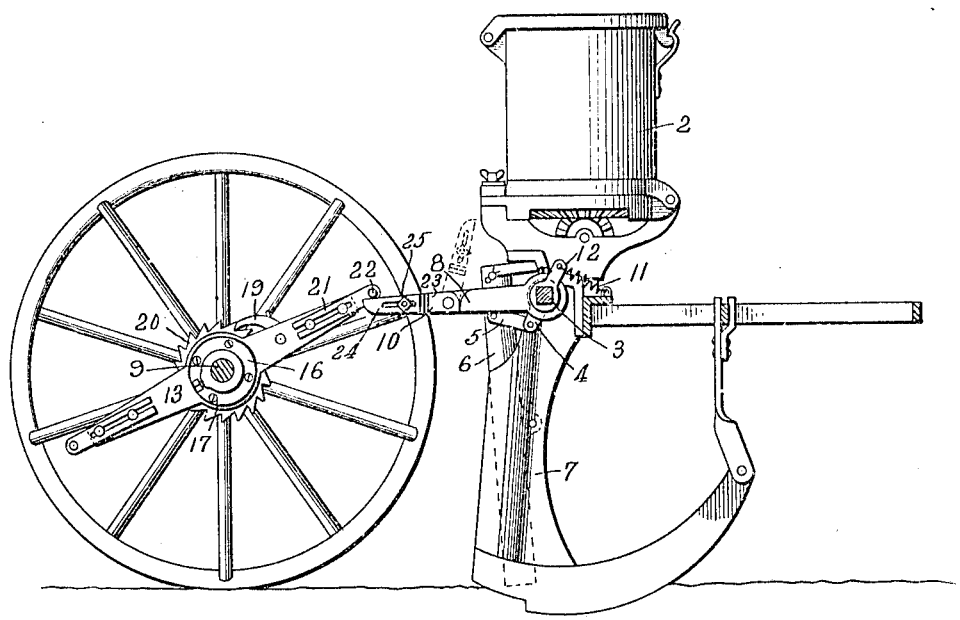
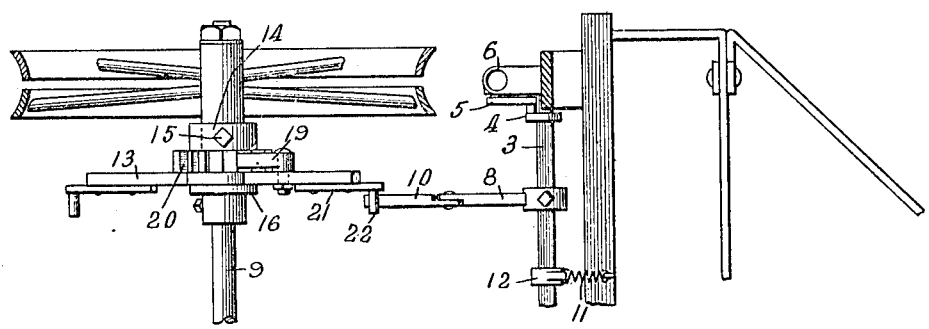
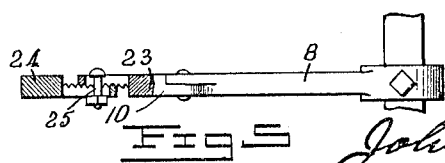
Witnesses
Inventor
John L. Baldwin
By Lungers. Cushman Rea
Attorneys

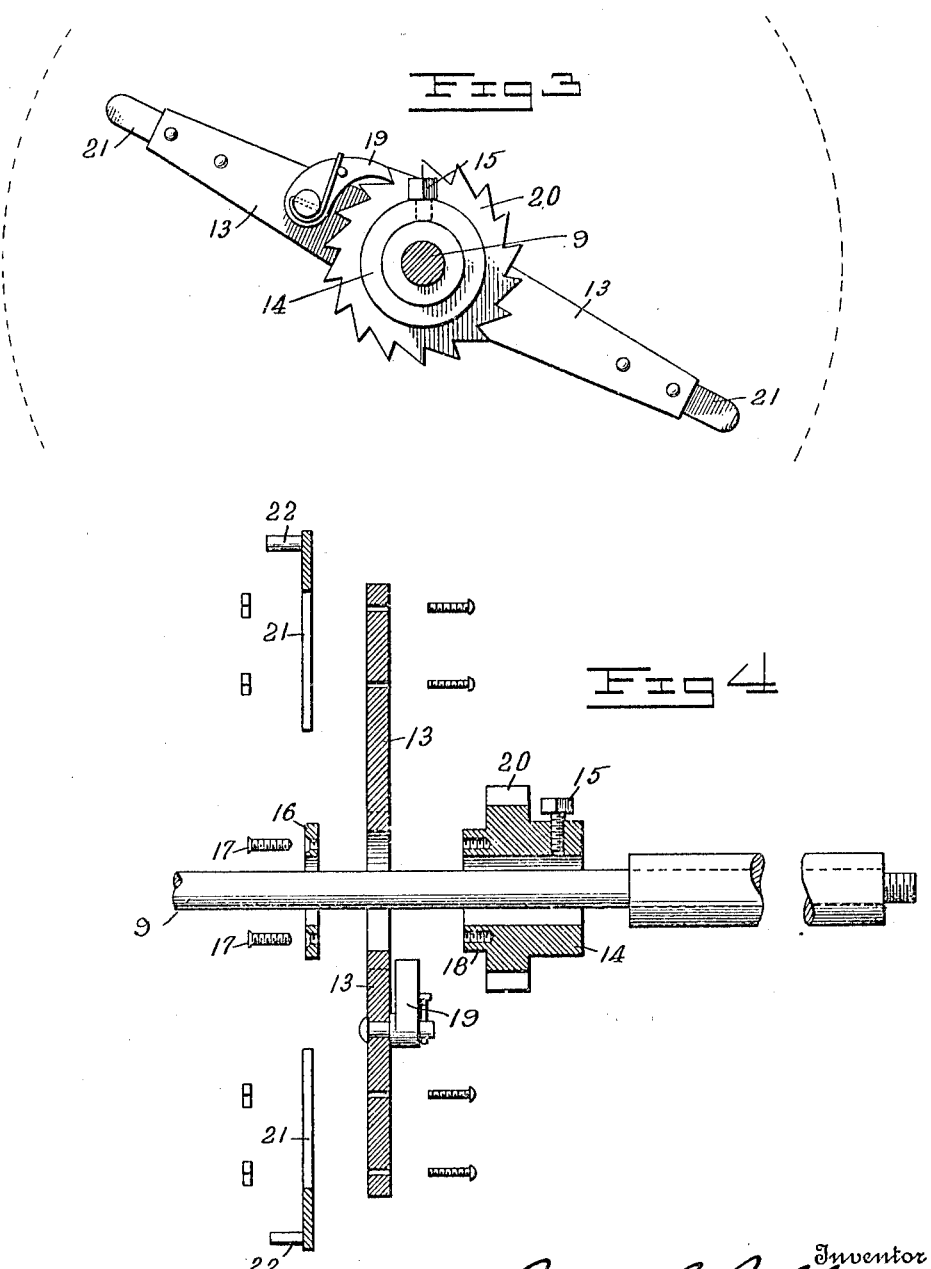

UNITED STATES PATENT OFFICE.

JOHN L. BALDWIN, OF WASHINGTON, DISTRICT OF COLUMBIA.

SEEDING ATTACHMENT FOR PLANTERS.

949,254.  Specification of Letters Patent.  Patented Feb. 15, 1910.

Application filed September 18, 1909. Serial No. 518,358.

*To all whom it may concern:*

Be it known that I, JOHN L. BALDWIN, a citizen of the United States, residing at Washington, in the District of Columbia, have invented new and useful Improvements in Seeding Attachments for Planters, of which the following is a specification.

The present invention relates to planters, and particularly to corn planters of that type in which the seed is delivered from the hopper through the seed tubes and planting shoes at regular intervals, so as to uniformly space the hills to the end that the field may be conveniently worked with a horse hoe or cultivator.

The use of a check wire in connection with check-row planters has long been the customary way to secure this uniformity of hill spacing; and it has been accomplished also by the use of ground wheels which would operate the seed slide at intervals and deliver the seed.

The present invention has for its object to eliminate the use of check wires and ground wheels for operating the seed plate, and provide an attachment which may be placed upon any standard planter with slight mechanical adaptations of the attachment; which will operate the seed plate at regular intervals so as to space the hills uniformly; and, furthermore, which may be so adjusted as to enable the operator to vary the timing and start planting from a determined spot with certainty.

Briefly stated, the invention comprises a plurality of rotating arms carried by the axle of the planter, and capable of being fitted to any planter of standard make, which rotating arms at regular intervals throw a seed-plate tripping device and deliver the seeds uniformly spaced, the tripping device being of such character that it may be attached to the seed plate shaft of any standard check-row planter; the seed plate tripping device being of such construction that its operation may be readily intermitted when desired and the planting action suspended. The trip operating arms, which, as heretofore stated, are carried by and rotatable with the axle, are adjustable both angularly and radially; the angular adjustment being for the purpose of permitting the operator to rotate these trip operating arms so as to secure a definite timing in starting the planter; and the radial adjustment is to provide for any slight variation in the relation of the parts due to planter structure or position of the parts.

In the accompanying drawings I have illustrated one form of my invention, but as this is merely illustrative of one embodiment I do not wish to have the disclosure regarded as restrictive, it being obvious that numerous mechanical variations may be adopted without going beyond the range of my invention.

In the said drawings—Figure 1 is a side elevation of so much of a planter as will illustrate the application of my invention. Fig. 2 is a plan view of the structure shown in Fig. 1, the seed hopper shown in Fig. 1 being removed. Fig. 3 is an enlarged detail view of the trip operating arms carried by the axle. Fig. 4 is a view of the structure shown in Fig. 3, showing the parts separated, portions of the structure being in section for clearness. Fig. 5 is an enlarged detail view of a seed plate trip of slightly different form from that shown in Fig. 2.

Referring to the drawings by numerals, like numbers indicating like parts in the several views, 2 indicates the seed hopper, which is of any standard or desired construction, it being understood that this hopper is provided with the usual seed plate, and plate-operating mechanism found in planters. Below the said hopper 2 is mounted the seed plate rock-shaft 3, of any usual or desired construction, this rock shaft 3 being connected by arm 4 and link 5 with the seed tube 6, which is pivoted in the usual manner to the shoe frame 7, said shoe, tube, hopper, and seed plate shaft, being supported on the front and runner frame in the usual manner. The parts thus far described are of the usual structure and are similar to those found in any standard planter.

In order to secure the oscillatory movement of the seed plate shaft 3 ordinarily secured by the action of the check wire, I provide the tripping arm 8, which is adjustably secured to the shaft 3 in any suitable way and projects rearwardly toward the axle 9 of the planter, this trip arm being jointed so as to have a toe portion 10, which, when in the full line position shown in Figs. 1 and 2, projects into the path of movement of trip-operating arms carried by the axle of the planter, the trip 8 being thereby moved and the necessary oscillation given to the seed plate shaft 3, which in turn through the crank 4 and link connection 5, moves the seed tube 6 to and from its delivering and cut off positions. The pivoted toe portion 10 of the trip 8 may be thrown to the dotted line position shown in Fig. 1, when it is desired to intermit the operation of the seed plate, so that the trip-operating arms will rotate idly past the trip. The shaft 3 is held normally in the position shown in Fig. 1 by a spring 11 connecting an arm 12 on the shaft with a fixed part of the machine.

The trip operating devices in the present instance are made up of a plate 13 having radially projecting arms on either side, the said plate 13 being secured to a hub 14 adapted to be clamped to the planter axle 9, preferably just inside the supporting wheel, as shown in Fig. 2, in any suitable manner, as, for example by means of a set screw 15, as shown best in Fig. 4. The plate 13 in the present construction is fitted over a projecting shoulder on the hub 14 and is held in place by a clamping plate 16 and suitable plate holding screws 17, although this, of course, is a matter of mere mechanical design and one which may be varied to considerable extent. The said plate 13 is free to rotate upon the hub shoulder 18 and carries a spring pawl 19, which, as shown in Fig. 1, engages a ratchet 20 on the hub 14 so that the plate 13 is locked against rotation in one direction, but is free to be rotated in the other direction with the spring pawl 19 trailing idly over the teeth 20 of the ratchet. The said plate 13 carries radially adjustable, trip-engaging arms 21, which, in the present form, are shown as substantially L-shaped so as to provide a tripping pin 22 which lies at right angles to the toe 10 of the seed plate trip, the said arms 21 being slotted and normally clamped to the plate 13 by suitable screws and nuts, this slotted construction giving a sufficient range of adjustability for the arms 21 on the plate 13 to meet the ordinary requirements as to adjustment between the seed plate trip and the rotating arms. It will be obvious that by this construction a very simple and readily attached device is provided, for the hub 14, which supports all of the operating parts of the trip operating instrumentalities, is carried by the hub of the planter wheel, as will be clear from an inspection of Fig. 2, and this adapts the device to practically any standard planter and involves no special construction or arrangement of planter frame, for in the application of the device all that is necessary is to remove the planter wheel, slip the hub 14 to proper position on the wheel hub and then assemble all of the other parts, including the plate 13, the adjustable arms 21, and the clamping plate 16 on this hub 14, which is, of course, locked in position in any suitable manner, as by the set screw 15 shown; the clamping plate 16 being provided to hold the wheel and attachment in place. This makes the attachment practically one with the wheel hub in the embodiment herein shown, and obviously the ratchet hub 14 may be fitted to almost any hub within reasonable limits. This same adaptability of the trip operating devices to the hub of the planter wheel is true of the adjustable tripping arm 8, hereinbefore described, for it will be seen that the hub of the tripping arm 8 may be slipped in place on the seed plate shaft 3 of the usual check row type of planter, and obviously the hub of the tripping arm 8 may be adapted within reasonable limits to different seed plate shafts to secure the necessary operation of the shaft and its seed plates. It is this adaptation of my attachment to the present type of planter in which a check wire is used that constitutes its practical value to a large extent, for the novel construction which I have devised permits this adaptation without the necessity of any special form of planter being built to dispense with the check wire, and my invention permits further of the conversion of any standard check row planter to one in which the check wire may be dispensed with.

In the form of seed-plate shaft tripping arm shown in Fig. 2, no provision for adjustability is made, but in Figs. 1 and 5 I have shown a form which will permit the arm to be lengthened or shortened, as desired. In this form the pivoted toe-portion is made in two parts, 23 and 24, which are slotted and connected by a clamping bolt 25, the proximate faces of the two parts being preferably ratcheted or ribbed, as shown, to insure a fixed relation of the parts. This adjustability both of the rotating arms 21 and the tripping arm 8 is desirable, in that it gives a greater flexibility of structure to meet varying conditions; for, since it is apparent that the operating arms 21 may not be lengthened beyond the diameter of the planter wheel, and it might, under extreme conditions be difficult to secure coöperation between a non-adjustable tripping arm and the operating arms 21, provision, such as above described for lengthening the arm 8, is desirable.

Ordinarily the only adjustment of the parts that will be found necessary will be those necessary to meet the variations between planters of different makes in which the relation of the axle and seed plate shaft differs, and, again, the relation of the seed-plate shaft 3 to the axle 9 varies somewhat as the planting shoes 7 are raised or lowered to make shallow or deep furrows.

The operation of the device is as follows: The planter having been brought to the position where a row is to be started the trip operating arms can be brought to the relation shown in Fig. 1 with respect to the trip by simply rotating the plate 13 forward with the pawl 19 trailing around the ratchet until the trip operating arm has been brought into engagement with the pivoted toe 10 of the seed plate shaft trip. Upon starting the team, the pin 22 on the arm 21 will throw the trip 8 downwardly, rocking the seed plate shaft 3 and throwing the seed tube 6 to position to receive seed from the hopper and deliver it to the hill. Immediately the trip operating pin passes the end of the toe 10 on the tripping arm the return spring 11 will throw the shaft 3, tube 6, and tripping arm 8, to the normal position shown in Fig. 1, and in position to be struck by the next succeeding arm of the rotating trip-operating device. The operating arms on the axle being spaced apart at fixed intervals, will actuate the seed plate shaft regularly and give uniform spacing of the hills.

When the operator desires to suspend the seed delivering, as, for example, when driving to and from the field, he may simply throw the pivoted toe 10 of the trip arm 8 to the position shown in dotted lines in Fig. 1, so that it will be out of the path of the rotating arms and no seed delivery will be made.

One of the advantages of my device is that it is adaptable to any ordinary planter with but slight mechanical work, its construction and application being such that it may be made up in quantities and sold as an attachment, and, furthermore, but little work is necessary to readily fit it to the existing type of planters. Its capabilities for adjustment in order that the timing of the seed delivering devices may be accurately determined is of great value, for after the first row has been planted, the operator may bring his team to proper position for the return row, and may then adjust the trip operating arms so as to time the seed delivering operation accurately and accomplish it with certainty.

What I claim is:

1. An attachment for planters having the usual seed containing and delivering instrumentalities and actuating rock shaft therefor; which attachment comprises a tripping arm adapted to be mounted on the rock shaft; an operating means for said tripping arm embodying a ratchet hub removably fixed to the hub of one of the planter wheels, and an adjustable radial arm carried by the said ratchet hub.

2. An attachment for planters having the usual seed containing and delivering instrumentalities and actuating rock shaft therefor; which attachment comprises a tripping arm adapted to be mounted on said rock shaft and provided with a pivoted toe portion; and means for operating said tripping arm embodying a ratchet hub removably fixed to the hub of one of the wheels of the planter, a plate rotatably mounted on said ratchet hub and locked against movement thereon in one direction, and radially adjustable arms carried by said plate.

3. An attachment for planters having the usual seed containing and delivering instrumentalities and actuating rock shaft therefor; which attachment comprises a tripping arm provided with a pivoted and longitudinally adjustable toe portion mounted on said rock shaft; and means for operating said tripping arm, embodying a ratchet hub removably fixed to the hub of a planter wheel, a plate rotatably mounted on said ratchet hub and having a pawl which locks it against rotation in one direction only, and radially adjustable substantially L-shaped arms carried by said plate and adapted to engage said tripping arm.

4. An attachment for planters having the usual seed holding and delivering instrumentalities and actuating shaft therefor; which attachment comprises a tripping arm secured to said actuating shaft and provided at its end with a pivotally mounted longitudinally extensible toe portion; and means for operating said tripping arm and its shaft embodying a ratchet hub adapted to be fitted to the hub of a wheel of the planter and locked thereto so as to rotate with the wheel, an independent plate rotatably mounted on said ratchet hub and locked against rotation thereon in one direction by means of a pawl, and substantially L-shaped adjustable arms radially disposed with respect to said plate and adjustable thereon to engage said tripping arm and actuate said rock shaft and the seed delivering instrumentalities.

5. An attachment for planters having the usual seed holding and delivering instrumentalities and actuating shaft therefor; which attachment comprises a tripping arm 8 adapted to be mounted on said rock shaft, a pivoted toe 23 on said tripping arm, said toe having an adjustable extension 24; and means for operating said tripping arm, embodying a ratchet hub 14 adapted to be fixed to a planter wheel hub to rotate therewith, a plate receiving hub shoulder 18 on said ratchet hub, a plate 13 rotatably mounted on said hub shoulder 18 and having a spring pawl 19 to engage the ratchet 20 on the hub 14 and lock said plate 13 against rotation in one direction, means for securing said plate 13 in position on said hub 14, and substantially L-shaped arms 21 radially disposed on said plate 13 and adjustable to vary the position of said L-shaped arms 21, the said arms being adapted to engage and operate the tripping arm 8, substantially as shown and described.

6. A seeding attachment for planters having the usual seed containing and delivering instrumentalities and actuating rock shaft therefor; which attachment comprises a tripping arm 8 mounted on said rock shaft and adjustable longitudinally thereon, a longitudinally extensible pivoted toe portion on said arm 8 for the purposes described; and means for periodically striking said tripping arm 8 and oscillating said actuating rock shaft embodying a hub 14 adapted to be removably and adjustably fixed to the hub of a wheel of the planter, said hub 14 having a ratchet projection 20 thereon, a plate receiving hub shoulder 18 on said ratchet hub 14, a plate 13 rotatably mounted on said hub shoulder 18 and abutting the ratchet projection 20, a ratchet engaging pawl 19 carried by said plate 13 and adapted to lock the plate against rotation in one direction, while leaving it free to be adjusted in the other direction of rotation, a locking plate 16 to hold said rotatable plate 13 in position on the hub 18, and radially adjustable L-shaped arms 21 slotted at their inner ends secured to said plate 13 by suitable slot engaging bolts to strike and throw said tripping arm 8 periodically and oscillate said rock shaft.

7. A seeding attachment for planters having the usual seed holding and delivering instrumentalities and rock shaft for actuating said instrumentalities, which attachment comprises a tripping arm mounted on said rock shaft and adapted when struck to oscillate said shaft; and actuating mechanism for said tripping arm removably fixed to the wheel hub of the planter and embodying a ratchet hub portion fitted to the wheel hub and carrying a rotatable plate having radially adjustable trip engaging arms, said plate having a spring pawl engaging said ratchet hub to lock it against rotation in one direction on said hub and leave it free for adjustment in the other direction on said hub.

In testimony whereof I have hereunto set my hand in presence of two subscribing witnesses.

JOHN L. BALDWIN.

Witnesses:
ARTHUR L. BRYANT,
A. O. CUSHMAN.